United States Patent
Sauers et al.

(10) Patent No.: US 11,774,768 B2
(45) Date of Patent: Oct. 3, 2023

(54) FACE SEAL FOR HEAD-MOUNTED DISPLAY

(71) Applicant: Apple Inc., Cupertino, CA (US)

(72) Inventors: Jason C. Sauers, Sunnyvale, CA (US); Phil M. Hobson, Menlo Park, CA (US); Edward S. Huo, Sunnyvale, CA (US); Fletcher R. Rothkopf, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 368 days.

(21) Appl. No.: 16/118,504

(22) Filed: Aug. 31, 2018

(65) Prior Publication Data

US 2019/0079301 A1 Mar. 14, 2019

Related U.S. Application Data

(60) Provisional application No. 62/558,401, filed on Sep. 14, 2017.

(51) Int. Cl.
*G02B 27/01* (2006.01)

(52) U.S. Cl.
CPC .. *G02B 27/0176* (2013.01); *G02B 2027/0169* (2013.01)

(58) Field of Classification Search
CPC ............ G02B 27/017–0176; G02B 2027/0169
See application file for complete search history.

(56) References Cited

U.S. PATENT DOCUMENTS

| 6,388,640 | B1 | 5/2002 | Chigira et al. |
| 6,520,182 | B1 | 2/2003 | Gunaratnam |
| 7,216,647 | B2 | 5/2007 | Lang et al. |
| 8,661,562 | B2 | 3/2014 | Calilung et al. |
| 9,274,340 | B2 | 3/2016 | Lyons |
| 2011/0225709 | A1* | 9/2011 | Saylor ............... A61F 9/025 2/431 |
| 2012/0218507 | A1 | 8/2012 | Calilung et al. |
| 2014/0191941 | A1* | 7/2014 | Sherlock ............ G06F 1/163 345/156 |
| 2015/0102983 | A1 | 4/2015 | Serota |
| 2015/0234189 | A1 | 8/2015 | Lyons |

(Continued)

FOREIGN PATENT DOCUMENTS

| CN | 102711031 A | 10/2012 |
| CN | 104136957 A | 11/2014 |

(Continued)

OTHER PUBLICATIONS iFIXIT.COM, "PlayStation VR Teardown", Published Oct. 13, 2016, Downloaded Jul. 15, 2017, https://www.ifixit.com/Teardown/PlayStation+VR+Teardown/69341, 18 pp.

(Continued)

*Primary Examiner* — Hang Lin
(74) *Attorney, Agent, or Firm* — Young Basile Hanlon & MacFarlane, P.C.

(57) ABSTRACT

A head-mounted display to be worn by a user includes a housing, a compressible material, and a support member. The compressible material is connected to the housing and is configured for contact with the user. The support member is disposed in the compressible material. The support member is movably connected to the housing.

2 Claims, 12 Drawing Sheets

(56) References Cited

U.S. PATENT DOCUMENTS

| | | | | |
|---|---|---|---|---|
| 2015/0366504 | A1* | 12/2015 | Connor | A61B 5/6804 600/301 |
| 2016/0062454 | A1 | 3/2016 | Wang et al. | |
| 2016/0077547 | A1 | 3/2016 | Aimone et al. | |
| 2016/0078278 | A1* | 3/2016 | Moore | G06K 9/00201 345/8 |
| 2016/0216760 | A1* | 7/2016 | Trutna | G06F 3/015 |
| 2016/0261300 | A1 | 9/2016 | Fei et al. | |
| 2017/0011602 | A1* | 1/2017 | Brav | G06F 1/163 |
| 2017/0090514 | A1 | 3/2017 | Byun et al. | |
| 2017/0223161 | A1* | 8/2017 | Lau | H04M 1/04 |
| 2018/0292660 | A1* | 10/2018 | Eastwood | G02C 5/16 |
| 2019/0235623 | A1* | 8/2019 | Pollard | G02B 27/0172 |

FOREIGN PATENT DOCUMENTS

| | | |
|---|---|---|
| CN | 204556956 U | 8/2015 |
| CN | 104880823 A | 9/2015 |
| CN | 205910420 U | 1/2017 |
| CN | 205958839 U | 2/2017 |
| CN | 206421101 U | 8/2017 |
| JP | H06-331927 A | 12/1994 |
| JP | H07-301762 A | 11/1995 |
| JP | H08-140014 A | 5/1996 |
| JP | H11119148 A | 4/1999 |
| JP | H11-298826 A | 10/1999 |
| JP | 2000-235164 A | 8/2000 |
| JP | 2002515127 A | 5/2002 |
| JP | 2010-226660 A | 10/2010 |
| JP | 2013522694 A | 6/2013 |
| JP | 6052755 B1 | 12/2016 |
| JP | 2017-011436 A | 1/2017 |
| KR | 20160026429 A | 3/2016 |
| WO | 2016/170717 A1 | 10/2016 |
| WO | 2017028284 A1 | 2/2017 |

OTHER PUBLICATIONS iFIXIT.COM, "Oculus Rift CV1 Teardown", Published Mar. 30, 2016, Downloaded Jul. 15, 2017, https://www.ifixit.com/Teardown/Oculus+Rift+CV1+Teardown/60612#s126787, 18 pp.

iFIXIT.COM, "HTC Vive Teardown", Published Apr. 26, 2016, Downloaded Jul. 15, 2017, https://www.ifixit.com/Teardown/HTC+Vive+Teardown/62213#s130812, 22 pp.

iFIXIT.COM, "Razer OSVR HDK 2 Teardown", Published Aug. 10, 2016, Downloaded Jul. 15, 2017, https://www.ifixit.com/Teardown/Razer+OSVR+HDK+2+Teardown/65804, 15 pp.

Invitation to Pay Additional Fees And, Where Applicable, Protest Fee, issued by the International Searching Authority n co-pending Intl. Application No. PCT/US2018/048996 dated Dec. 14, 2018 (10 pp).

* cited by examiner

FACE SEAL FOR HEAD-MOUNTED DISPLAY

CROSS-REFERENCE TO RELATED APPLICATIONS

This application claims the benefit of U.S. Provisional Application No. 62/558,401, filed on Sep. 14, 2017, the content of which is hereby incorporated by reference in its entirety for all purposes.

TECHNICAL FIELD

The application relates generally to face seals for head-mounted displays.

BACKGROUND

Head-mounted displays are devices that are worn on a user's head and incorporate one or more optical display devices. Some head-mounted displays have an open design in which the user's eyes are not shielded from the outside environment. Other head-mounted displays have a closed design that incorporates a face seal. The face seal is a portion of the head-mounted display that contacts the user's face around their eyes to block exterior light. In some designs, the face seal also helps support the head-mounted display relative to the user's head. One typical design for a face seal is a foam structure that contacts the user's forehead and extends around the outer sides of the user's eyes, with a gap or recess present in the area where the user's nose will be positioned.

SUMMARY

One aspect of the disclosure is a head-mounted display to be worn by a user. The head-mounted display includes a housing, a compressible material, and a support member. The compressible material is connected to the housing and is configured for contact with the user. The support member is disposed in the compressible material. The support member is movably connected to the housing.

Another aspect of the disclosure is a head-mounted display to be worn by a user. The head-mounted display includes a housing that defines an eye chamber and a peripheral portion that extends around the eye chamber. A first seal support member is connected to the peripheral portion of the housing and defines a first adjustable reaction surface. A second seal support member is connected to the peripheral portion of the housing and defines a second adjustable reaction surface. A face seal covers the first seal support member and the second seal support member.

Another aspect of the disclosure is a head-mounted display to be worn by a user. The head-mounted display includes a housing and a support member that is connected to the housing. The support member has a front surface. A sensor is located on the front surface of the support member. A compressible material is connected to the front surface of the support member.

DETAILED DESCRIPTION

The sizes and shapes of user's faces can vary widely. Some conventional face seal designs incorporate thick foam structures that are highly compressed in some areas by contact with the user's face, while remaining uncompressed or lightly compressed in other areas. For some face shapes and sizes, the foam structure may be unable to conform to the user's face, and ability of the foam structure to block light may be compromised. In implementations in which engagement of the face seal with the user's face is relied upon to support the head-mounted display, some users may experience uncomfortable areas of high pressure.

The disclosure herein is directed to face seals for head-mounted displays, components that can be incorporated in face seals for head-mounted displays, and components that can be used with face seals for head-mounted displays. The face seal designs disclosed herein include movable structures that conform the face shape of the user in order to enhance comfort and/or light-blocking, which improves the user experience.

Figure 1:
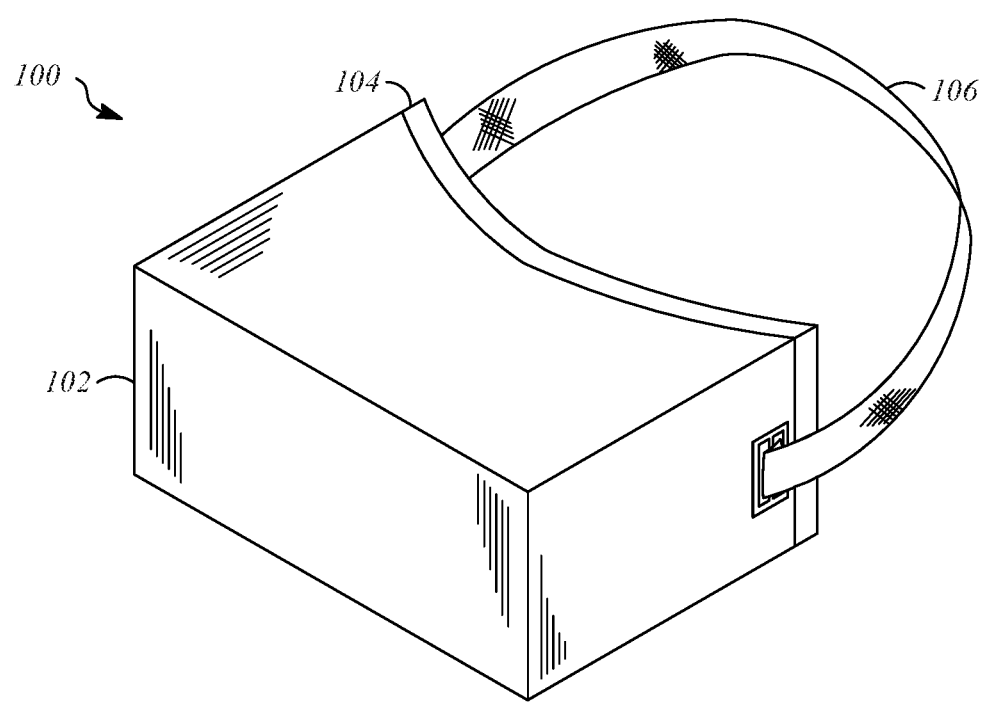
FIG. 1 is a perspective view illustration showing a head-mounted display.

FIG. 1 is a perspective view illustration showing a head-mounted display 100. The head-mounted display includes a housing 102, a face seal 104, and a headband 106. The face seal 104 and the headband 106 are connected to the housing 102. The face seal 104 is configured to engage and conform to the user's head in the area around the user's eyes. The headband 106 is configured to support the housing 102 relative to the user's head. In the illustrated example, the housing 102 is a generally rectangular structure, and headband 106 is a structure such as a strap or a rigid member that connects to the lateral sides of the housing 102 to extend peripherally around a user's head. The housing 102 may be a single-piece structure or may be a multi-piece structure, and is either rigid or semi-rigid. The headband 106 may include adjustment features, such as variable length strap assemblies that are adjusted using fasteners such as buttons, buckles, or hook-and-loop fasteners. The housing 102 and the headband 106 are shown and described to provide context, and it should be understood that the features described herein can be utilized with head-mounted displays that utilize a broad range of configurations. As one example, the headband 106 could include an additional strap that extends over the center of the user's head.

Figure 2A:
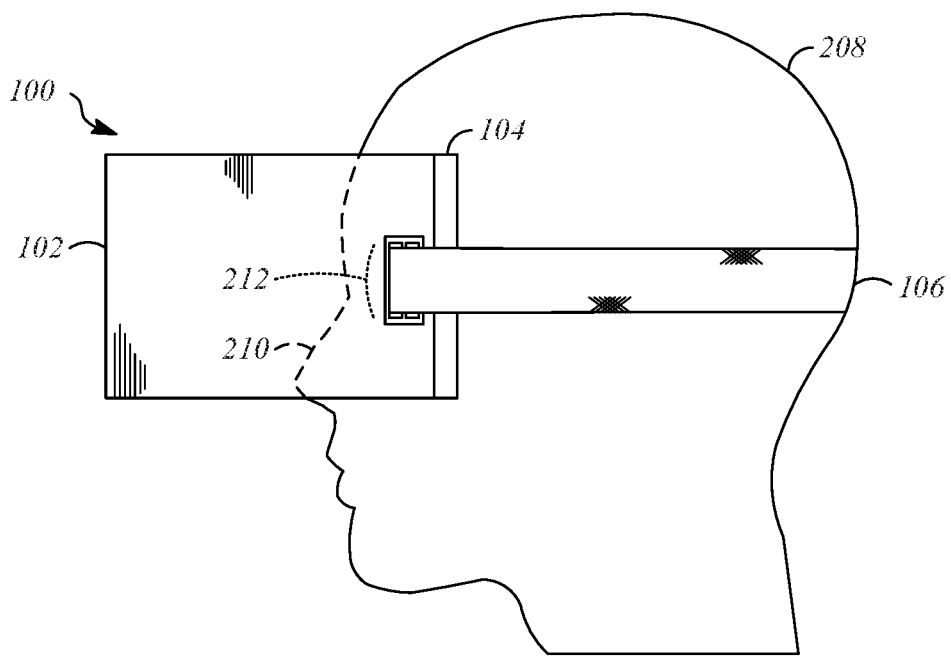
FIG. 2A is a side view showing the head-mounted display worn by a user.
Figure 2B:
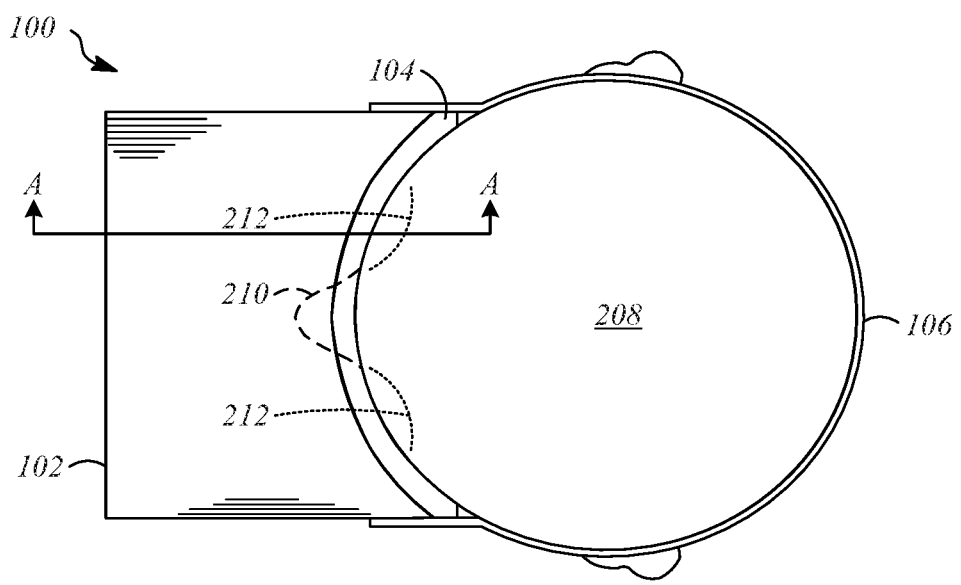
FIG. 2B is a top view showing the head-mounted display worn by the user.

FIG. 2A is a side view showing the head-mounted display 100 worn by a user 208, and FIG. 2B is a top view showing the head-mounted display 100 worn by the user. The face seal 104 contacts an upper part of the face 210 of the user 208. As an example, the face seal 104 may contact the forehead, the temples, the cheeks, and/or the nose of the user 208, and extend around the eye area 212 of the user 208.

Figure 3:
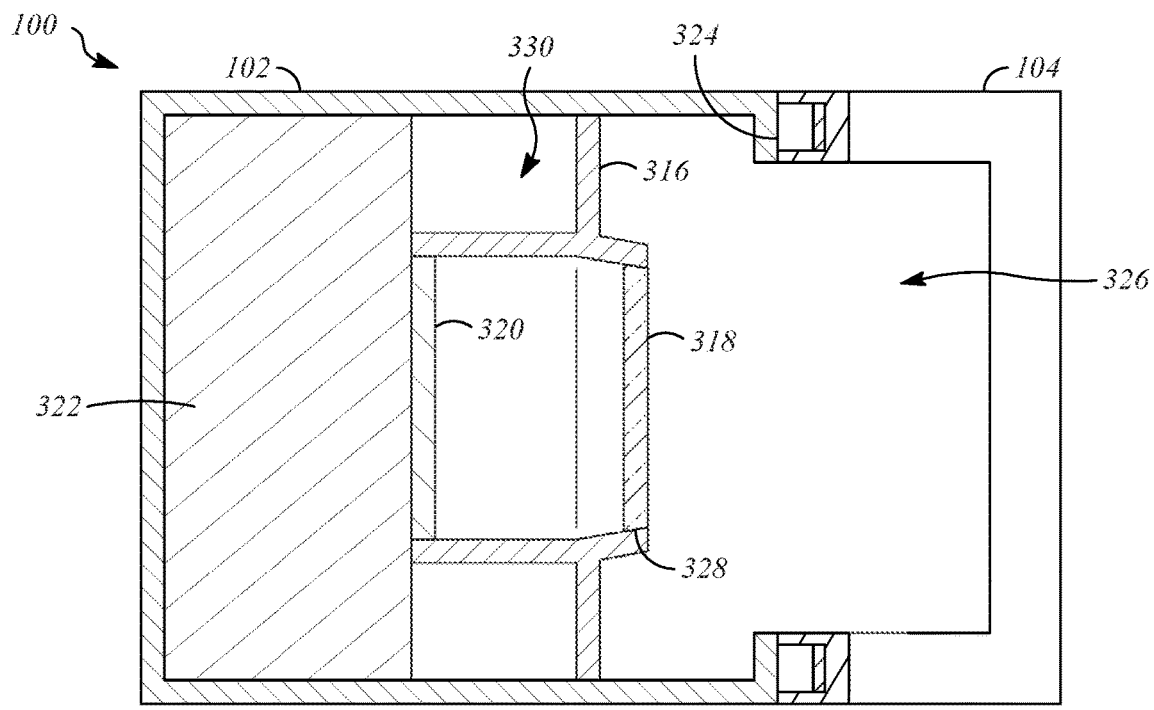
FIG. 3 is a cross-section view of the head-mounted display taken along line A-A of FIG. 2B.

FIG. 3 is a cross-section view of the head-mounted display 100 taken along line A-A of FIG. 2B. The head-mounted display 100 includes the housing 102, a divider wall 316, lenses 318 (e.g. two lenses that are each paired with one of the user's eyes), one or more display devices 320, and electronic components 322.

The housing 102 includes an external structure of the head-mounted display 100 and may include parts of an internal structure of the head-mounted display 100. The housing 102 is connected to the headband 106 (FIGS. 1-2B) or other support structure. Internal spaces of the head-mounted display 100 are defined by the housing 102, in order to support and/or enclose portions of the head-mounted display 100 such as the divider wall 316, the lenses 318, the display devices 320, and the electronic components 322. The housing 102 may be a multi-part structure, or may be a single part structure. The housing 102 may be rigid or semi rigid, and with respect to multi-part structures for the housing 102, may include various portions having differing material properties inclusive of rigid portions and flexible portions.

A front end of the housing 102 includes a peripheral portion 324, which is adjacent to the user 208 when worn. The peripheral portion 324 extends around part or all of the housing 102 at the front end, and provides a support surface or support structure for the face seal 104. Other components and/or structures may be formed on or supported by the peripheral portion 324, such as sensors.

The divider wall 316 is positioned inside the housing 102. The divider wall 316 has a first side that is exposed the exterior, and is adjacent to an eye chamber 326, which is defined within the housing 102 between the divider wall 316 and the face seal 104. When the head-mounted display 100 is worn by the user 208, the eyes of the user 208 are positioned adjacent to the eye chamber 326. By engagement of the face seal 104 with the face 210 of the user 208, the face seal 104 is operable to reduce or eliminate the amount of light from the environment outside the face seal 104 that enters the eye chamber 326.

The divider wall 316 may support the lenses 318, either directly or indirectly. In the illustrated example, the lenses 318 are connected to the divider wall 316 and are located in apertures 328 that are formed in the divider wall 316. Other implementations of the head-mounted display 100 may connect the lenses 318 to the divider wall 316 indirectly. As one example, the lenses 318 can be supported by an interpupillary distance adjustment mechanism that is operable to move the lenses 318 laterally toward or away from each other. As another example, the lenses 318 can be supported by an eye relief adjustment mechanism that is operable to adjust the position of the lenses 318 in the front-to-rear direction of the housing 102 to change the distance between the eyes of the user 208 and the lenses 318.

The lenses 318 focus, redirect, and reshape the images from the display devices 320 to achieve a desired focal length and other optical properties. The display devices 320 are located in the housing 102 and are oriented such that they emit light (e.g., in patterns that form images) toward the lenses 318. As examples, the display devices 320 may be LED display panels, OLED display panels, or LCD display panels. In some implementation, the display devices 320 include two display panels that are each associated with one of the lenses 318. In other implementations, the display devices 320 include a single display panel that is associated with both of the lenses 318. The lenses 318 direct the images emitted by the display devices 320 toward the eyes of the user 208 in a manner that simulates the way the light from a three-dimensional environment reaches the eyes of the user 208. As one example, the lenses 318 may be biconvex lenses. As another example, the lenses 318 may be Fresnel lenses. Focal lengths for the lenses 318 may be, for example, between 25 mm and 50 mm.

On a second side of the divider wall 316, opposite the eye chamber 326, an internal chamber 330 is formed between the divider wall 316 and the housing 102. In some implementations, multiple internal chambers are present. In the illustrated example, the display devices 320 and the electronic components 322 are located in the internal chamber. The display devices 320 may be supported by the divider wall 316 (as illustrated), by the housing 102, or by other structures that are located in the internal chamber 330.

The electronic components 322 are located in the internal chamber 330 and may be supported by the housing 102 or by other structures that are present in the internal chamber 330. The electronic components 322 are connected to the display devices 320 and includes components that generate or receive content, in the form or signals or data, that are provided by the display devices to be output for display by the display devices 320 as images defined by emitted light. The electronic components 322 may also include sensors that detect conditions that are relevant to operation of the head-mounted display 100, such as the position and orientation of the head-mounted display 100.

Figure 4:
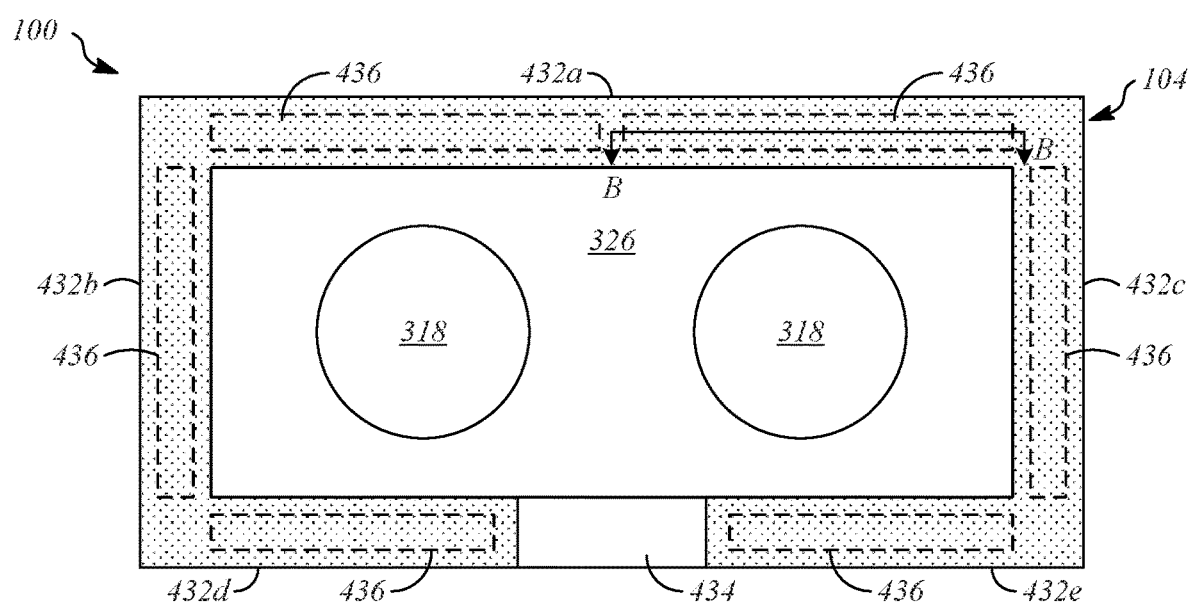
FIG. 4 is a front view of the head-mounted display showing the face seal 104.

FIG. 4 is a front view of the head-mounted display 100 showing the face seal 104. The face seal 104 includes an upper portion 432a, a left portion 432b, a right portion 432c, a lower-left portion 432d, and a lower-right portion 432e. The upper portion 432a is located on the peripheral portion 324 of the housing 102 adjacent to an upper surface of the housing 102. The left portion 432b is located on the peripheral portion 324 of the housing 102 adjacent to a left-side surface of the housing 102. The right portion 432c is located on the peripheral portion 324 of the housing 102 adjacent to a right-side surface of the housing 102. The lower-left portion 432d is located on the peripheral portion 324 of the housing 102 adjacent to a lower surface of the housing 102 and to the left side of a nose-relief area 434 that is formed on the housing 102 to provide space for the nose of the user 208. The lower-right portion 432e is located on the peripheral portion 324 of the housing 102 adjacent to a lower surface of the housing 102 and to the right side of the nose-relief area 434.

The face seal 104 is supported by one or more seal support members 436 that are each connected to the housing 102 in a manner than allows motion of each seal support member 436 relative to the housing 102. In the illustrated example, the seal support members 436 are independent elements that are incorporated in the face seal 104 in each of the upper portion 432a, the left portion 432b, the right portion 432c, the lower-left portion 432d, and the lower-right portion 432e. In other implementations, different numbers of the seal support members 436 are provided and different locations for the seal support members are provided. For example, the face seal 104 could incorporate two of the seal support members 436, such as a first seal support member positioned at the left side of the upper portion 432a and a second seal support member positioned at the right side of the upper portion 432a.

The face seal 104 is formed from a resilient compressible material that compresses in response to engagement with the face of the user 208, and expands when engagement ceases. Examples of resilient compressible materials that can be used for the face seal 104 include synthetic rubber, closed cell foam materials, and open cell foam materials. The seal support members 436 are embedded in or under the resilient compressible material of the face seal 104 to limit the degree of compression of the face seal 104.

The seal support members 436 conform to the geometry of the face of the user 208 relative to the housing 102 by moving, such as by rotation around an axis. Movement of the seal support members 436 disposes a fixed amount of the face seal 104 between the seal support members 436 and the user 208. Thus, by conforming to the geometry of the face of the user 208, users having various face shapes and head shapes can comfortably use the head-mounted display 100.

Figure 5A:
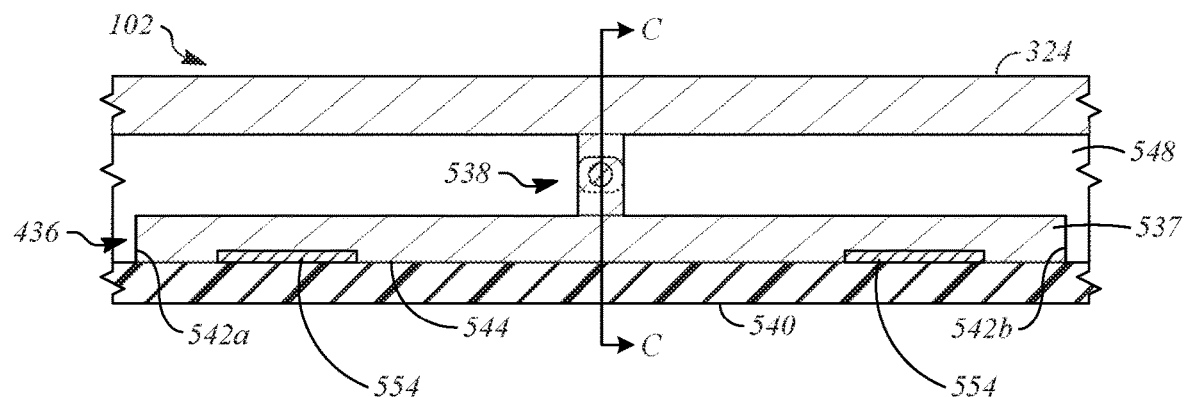
FIG. 5A is a cross-section view illustration taken across line B-B of FIG. 4 showing one of the seal support members supported by a first hinge assembly in a first angular orientation.
Figure 5B:
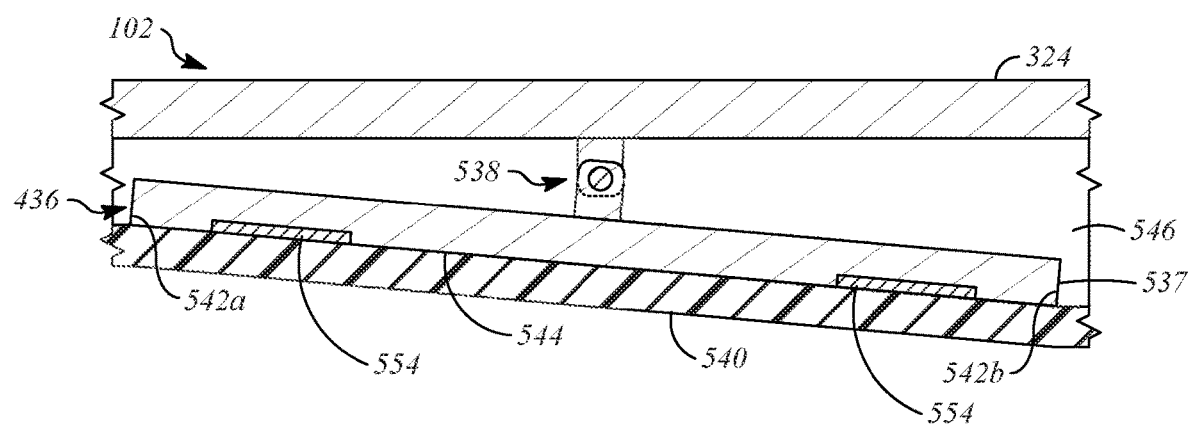
FIG. 5B is a cross-section view illustration taken across line B-B of FIG. 4 showing the seal support member of FIG. 5A supported by the first hinge assembly in a second angular orientation.
Figure 5C:
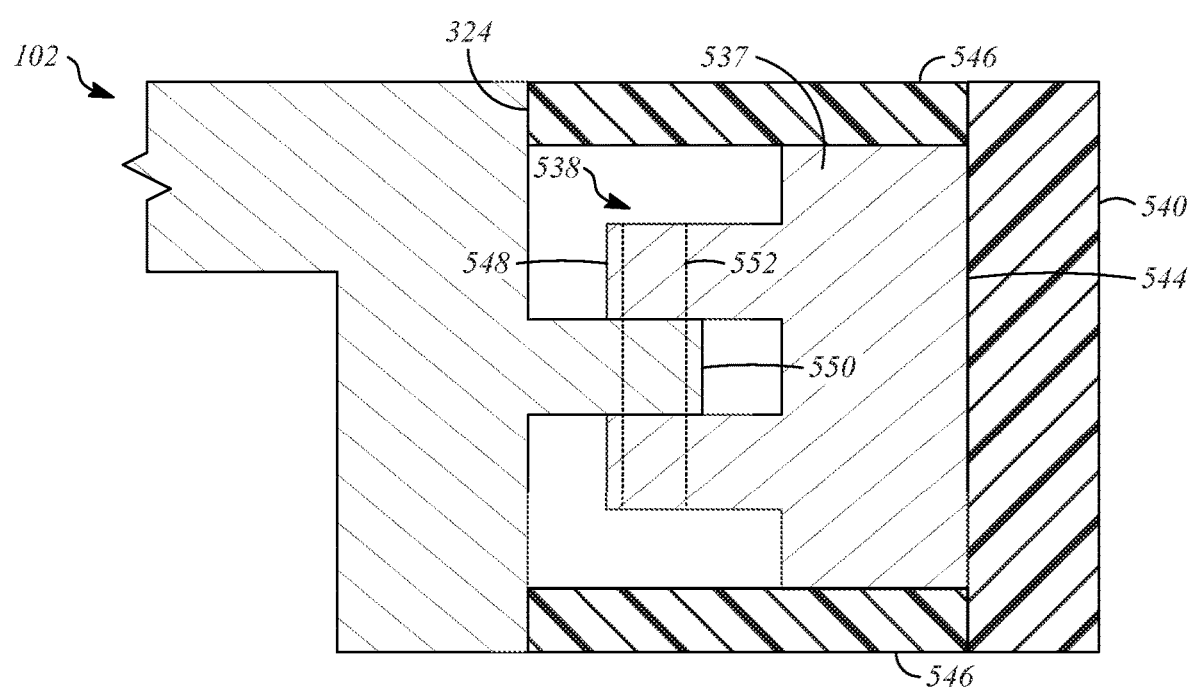
FIG. 5C is a cross-section view illustration taken across line C-C of FIG. 5A showing one of the seal support members supported by the first hinge assembly.

FIGS. 5A-5C show one of the seal support members 436 from the upper portion 432a of the face seal 104. In particular, FIG. 5A is a cross-section view illustration taken across line B-B of FIG. 4 showing the seal support member 436 in a first angular orientation, FIG. 5B is a cross-section view illustration taken across line B-B of FIG. 4 showing the seal support member 436 in a second angular orientation, and FIG. 5C is a cross-section view illustration taken across line C-C of FIG. 5A showing the seal support member 436 in the first angular orientation.

The seal support member 436 includes a primary portion 537 that supports a front portion 540 of the face seal 104. The primary portion 537 of the seal support member 436 provides support for the face seal 104 and provides a reaction surface against which the face seal 104 can be compressed. The primary portion 537 is not compressible, and may be formed from an incompressible material that is rigid or substantially rigid. As an example, the primary portion 537 may be formed from plastic.

The seal support member 436 is an elongate member, and may extend from a first end 542a to a second end 542b. As installed in the upper portion 432a, the primary portion 537 is elongate in the lateral direction of the housing 102. If installed in other locations, such as in the right portion 432c of the face seal 104, the seal support member 436 would be oriented to conform to that portion of the face seal 104, and could be vertically elongate. The primary portion 537 can be configured to conform to the shape of the face seal 104 and thus can be, as examples, straight or curved.

The seal support member 436 is connected to the peripheral portion 324 of the housing 102 by a hinge assembly 538. The hinge assembly 538 allows the seal support member 436 to move and thereby conform to the user 208. In the illustrated example, the hinge assembly 538 is positioned at or near the lateral center point of the seal support member 436, between the first end 542a and the second end 542b. Other locations can be utilized. As an example, the hinge assembly 538 could be positioned at or near the first end 542a or the second end 542b of the seal support member 436.

In the illustrated example, the hinge assembly 538 allows rotation on a single axis, such an axis that extends generally in an up-and-down direction relative to the housing 102. This allows for face shape accommodation in the area of the forehead of the user 208, to allow for differing head widths and differing degrees of roundness, by angling adjacent ones of the seal support members 436 at smaller angles relative to each other to accommodate smaller head sizes, and at larger angles relative to each other to accommodate larger head sizes. With respect to installation of the seal support member 436 at other locations, such as in the right portion 432c of the face seal 104, the hinge assembly 538 would be oriented to allow rotation along an axis that extends generally in a side-to-side direction. Other orientations could be utilized.

As described above, the hinge assembly 538 is a passive component. In an alternative implementation, the hinge assembly 538 may include a controllable actuator to actively adjust the seal support member 436 or to apply tactile feedback.

The front portion 540 of the face seal 104 is located on and covers a front surface 544 of the seal support member 436. The front portion 540 of the face seal 104 may be positioned adjacent to the front surface 544 of the seal support member 436, but without attachment to the seal support member 436. Alternatively, the front portion 540 of the face seal 104 may be connected to the front surface 544 of the seal support member 436, such as by adhesives or by mechanical fasteners.

The face seal 104 may also include connecting portions 546 that extend from the front portion 540 of the face seal 104 to the housing 102. The connecting portions 546 can be engaged with and/or connected to the peripheral portion 324 of the housing 102. The connecting portions 546 function to block ambient light from entering the eye chamber 326, and can be formed from an opaque material to help block transmission of light. The connecting portions 546 may be formed both on an outer periphery of the face seal 104 (i.e., adjacent to the outer surface of the housing 102) and on an inner periphery of the face seal 104 (i.e., adjacent to the eye chamber 326.

The connecting portions 546 may be formed from a flexible material to allow compression and expansion during movement of the seal support member 436. In one implementation, the connecting portions 546 are formed from the same material as the front portion 540 of the face seal 104 and these portions may be formed as an integral structure. In another implementation, the connecting portions 546 are formed from a flexible material that is more flexible and/or more compressible than the material used for the front portion 540 of the face seal 104. In another implementation, the connecting portions 546 are formed from a synthetic rubber material, and may include a bellows configuration.

As best seen in FIG. 5C, the hinge assembly 538 includes a first hinge part 548 that extends outward from a rear surface of the seal support member 436, and a second hinge part 550 that extends outward from the peripheral portion 324 of the housing 102. In the illustrated example of the first hinge part 548 and the second hinge part 550 are overlapping and/or interlocking structures (e.g., alternating plates) that are connected by a pin 552 that extends through apertures in the first hinge part 548 and the second hinge part 550 along the rotation axis of the seal support member 436. The pin 552 can be formed separately from the first hinge part 548 and the second hinge part 550 or can be an integrally formed projection located on one of the first hinge part 548 or the second hinge part 550. In other implementations, the hinge assembly 538 can utilize other known designs, such as a linkage (e.g., a four-bar linkage).

The hinge assembly 538 can incorporate structures that bias the hinge assembly in a direction of rotation or toward a centered position. Examples of suitable biasing structures include springs and compressible members, (e.g., rubber or foam) that is placed between the seal support member 436 and the peripheral portion 324 of the housing 102.

In some implementations, sensors 554 can be incorporated in the face seal 104. The sensors 554 are located on or adjacent to the front surface 544 of the seal support member 436, which maintains a consistent distance between the skin of the user 208 and the sensors 554, to allow information regarding the user to be sensed accurately. As one example, the sensors 554 can measure skin temperature. As another example, the sensors 554 can measure heart rate. Other types of sensors that measure other characteristics can be included.

Figure 6A:
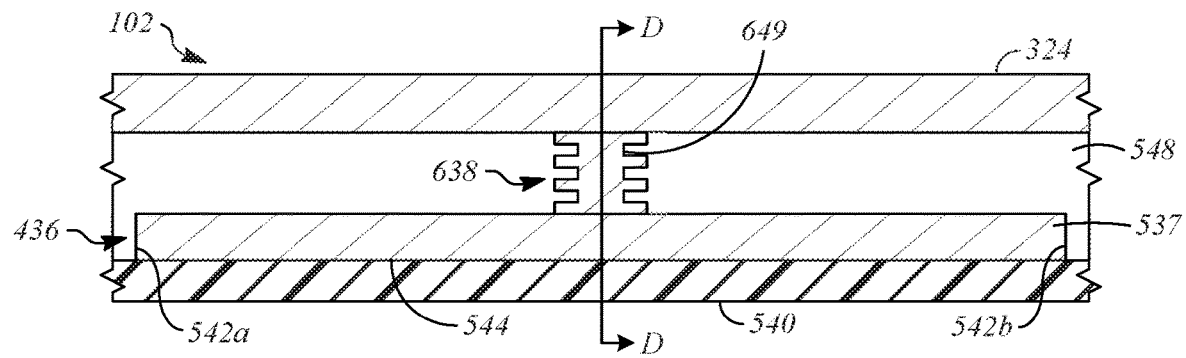
FIG. 6A is a cross-section view illustration taken across line B-B of FIG. 4 showing one of the seal support members supported by a second hinge assembly in a first angular orientation.
Figure 6B:
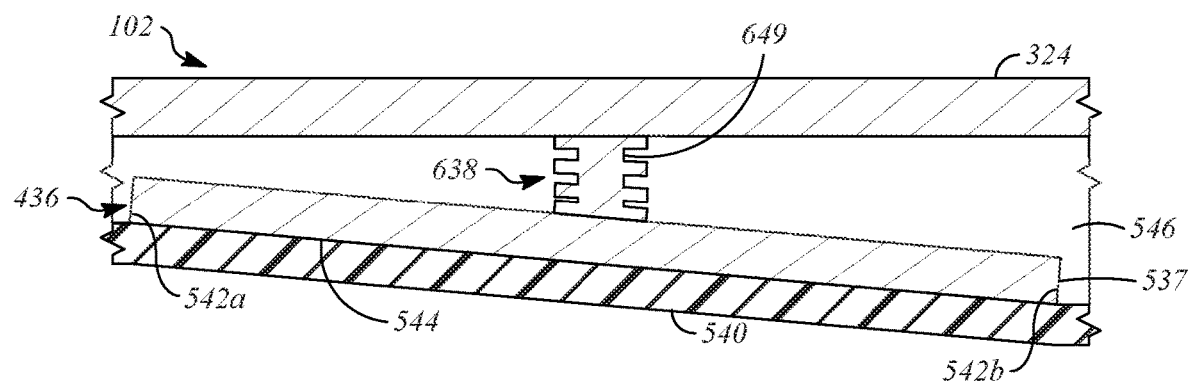
FIG. 6B is a cross-section view illustration taken across line B-B of FIG. 4 showing the seal support member of FIG. 6A supported by the second hinge assembly in a second angular orientation.
Figure 6C:
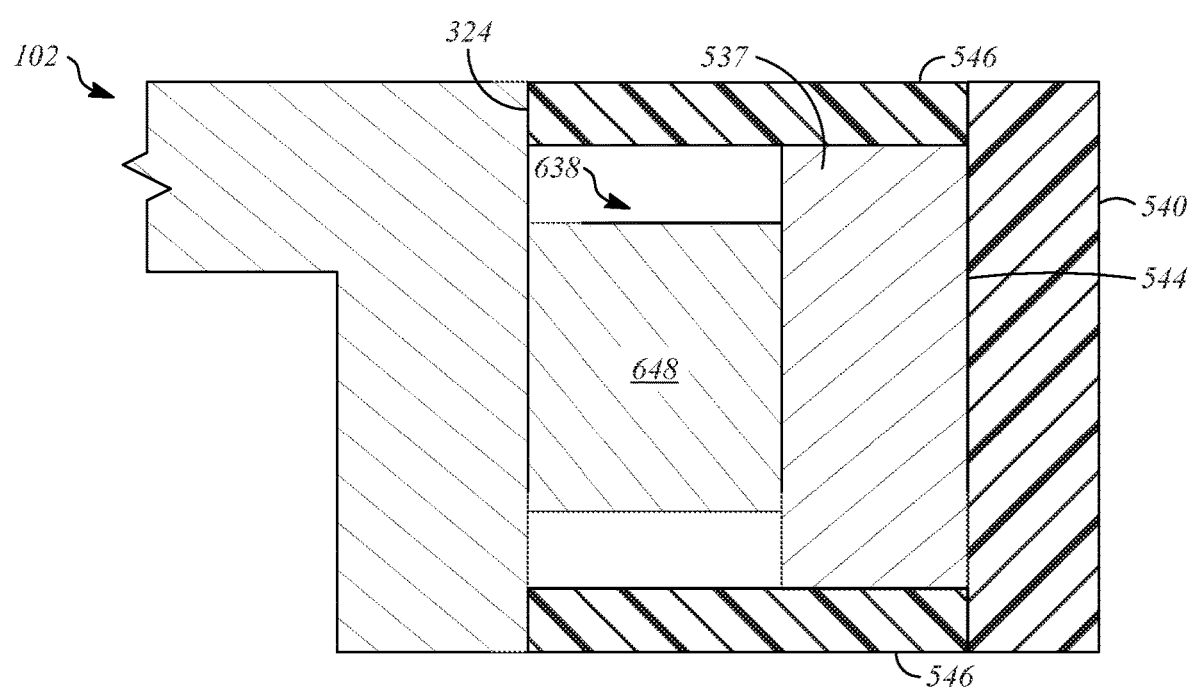
FIG. 6C is a cross-section view illustration taken across line D-D of FIG. 6A showing one of the seal support members supported by the second hinge assembly.

FIGS. 6A-6C show the seal support member 436 supported by a hinge assembly 638 according to an alternative implementation. In particular, FIG. 6A is a cross-section view illustration taken across line B-B of FIG. 4 showing the seal support member 436 and the hinge assembly 638 in a first angular orientation, FIG. 6B is a cross-section view illustration taken across line B-B of FIG. 4 showing the seal support member 436 and the hinge assembly 638 in a second angular orientation, and FIG. 6C is a cross-section view illustration taken across line D-D of FIG. 6A showing the seal support member 436 and the hinge assembly 638 in the first angular orientation.

The hinge assembly 638 is a living hinge type connection, which in the illustrated example, allows rotation around an upright axis similar to the hinge assembly 538. The hinge assembly 638 includes a hinge member 648, which may be formed of the same material and/or may be formed integrally with the seal support member 436. Alternatively, the hinge member 648 may be separately formed from a different more flexible material than the seal support member 436. In the illustrated example, upright grooves 649 are formed on side surfaces of the hinge member 648 to enhance side-to-side bending over a desired angular range.

Figure 7A:
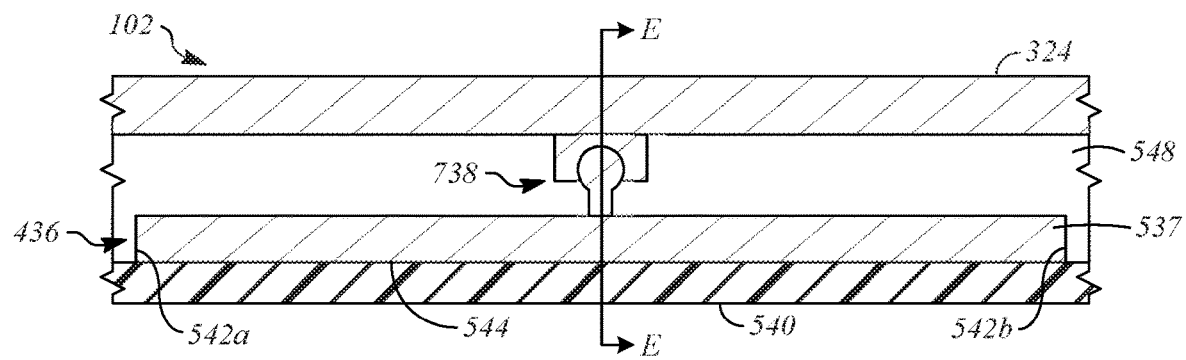
FIG. 7A is a cross-section view illustration taken across line B-B of FIG. 4 showing one of the seal support members supported by a third hinge assembly in a first angular orientation.
Figure 7B:
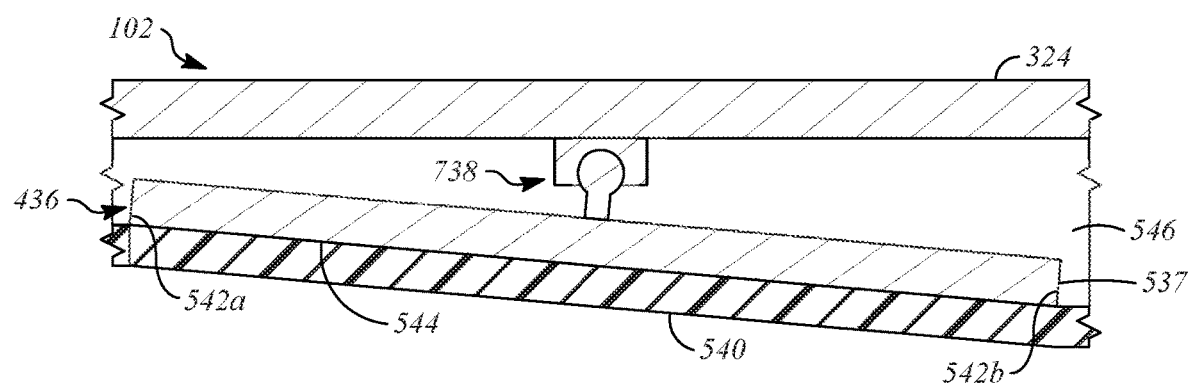
FIG. 7B is a cross-section view illustration taken across line B-B of FIG. 4 showing the seal support member of FIG. 6A supported by the third hinge assembly in a second angular orientation.
Figure 7C:
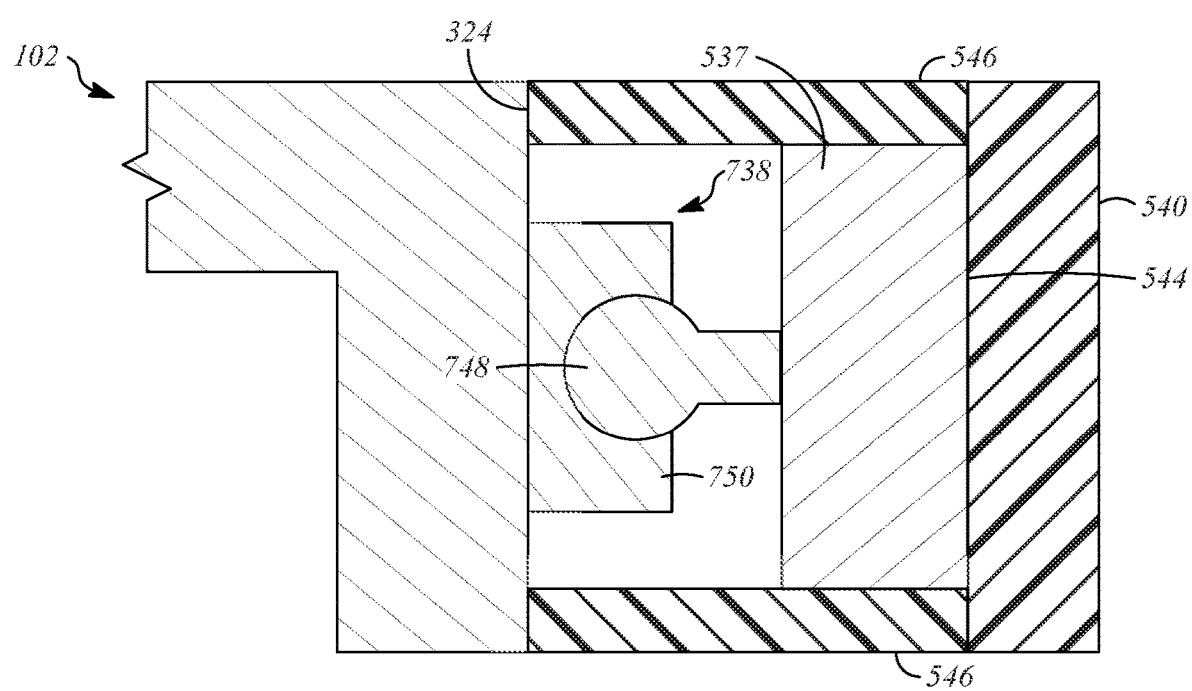
FIG. 7C is a cross-section view illustration taken across line E-E of FIG. 7A showing one of the seal support members supported by the third hinge assembly.

FIGS. 7A-7C show the seal support member 436 supported by a hinge assembly 738 according to an alternative implementation. In particular, FIG. 7A is a cross-section view illustration taken across line B-B of FIG. 4 showing the seal support member 436 and the hinge assembly 738 in a first angular orientation, FIG. 7B is a cross-section view illustration taken across line B-B of FIG. 4 showing the seal support member 436 and the hinge assembly 738 in a second angular orientation, and FIG. 7C is a cross-section view illustration taken across line E-E of FIG. 7A showing the seal support member 436 and the hinge assembly 738 in the first angular orientation.

The hinge assembly 738 includes a ball and socket type joint that allows three-axis rotation, subject to range-of-motion constraints placed on motion of seal support member 436 by engagement with the face seal 104. In the illustrated example a ball joint 748 is connected to a rear surface of the primary portion 537 of the seal support member 436, and a socket joint 750 is connected to and extends forward from the peripheral portion 324 of the housing 102. Alternatively, the positions of the ball joint 748 and the socket joint 750 can be reversed.

Figure 8A:
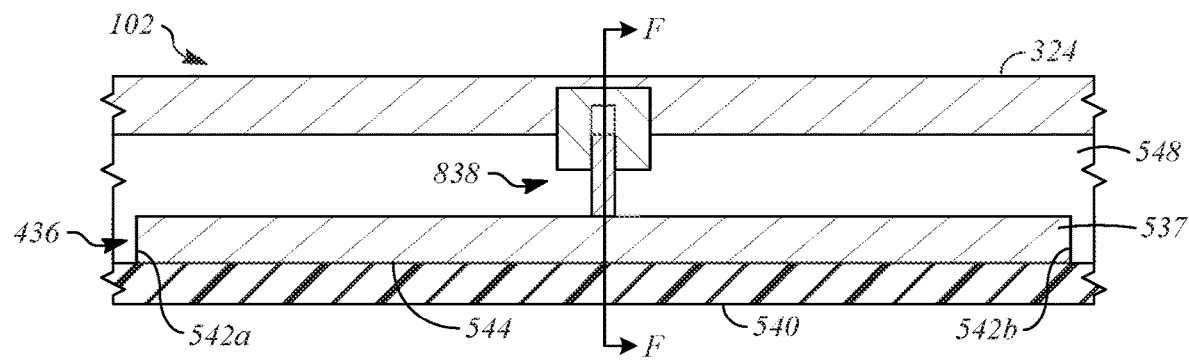
FIG. 8A is a cross-section view illustration taken across line B-B of FIG. 4 showing one of the seal support members supported by an adjustment assembly in a first angular orientation.
Figure 8B:
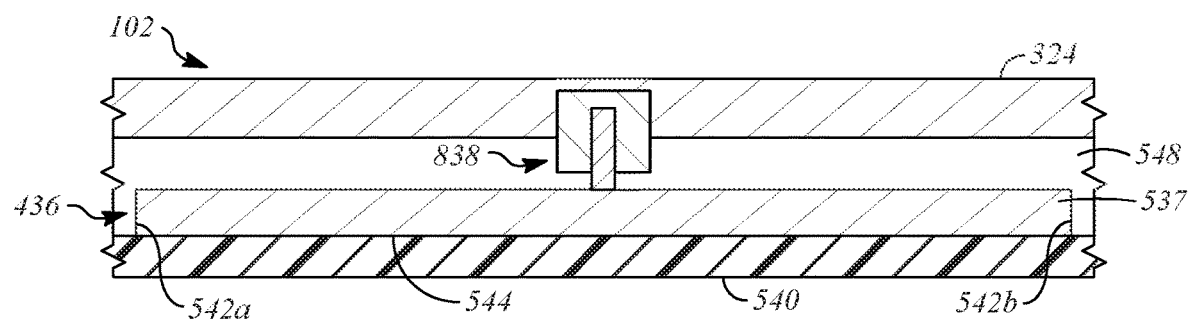
FIG. 8B is a cross-section view illustration taken across line B-B of FIG. 4 showing the seal support member of FIG. 6A supported by the adjustment assembly in a second angular orientation.
Figure 8C:
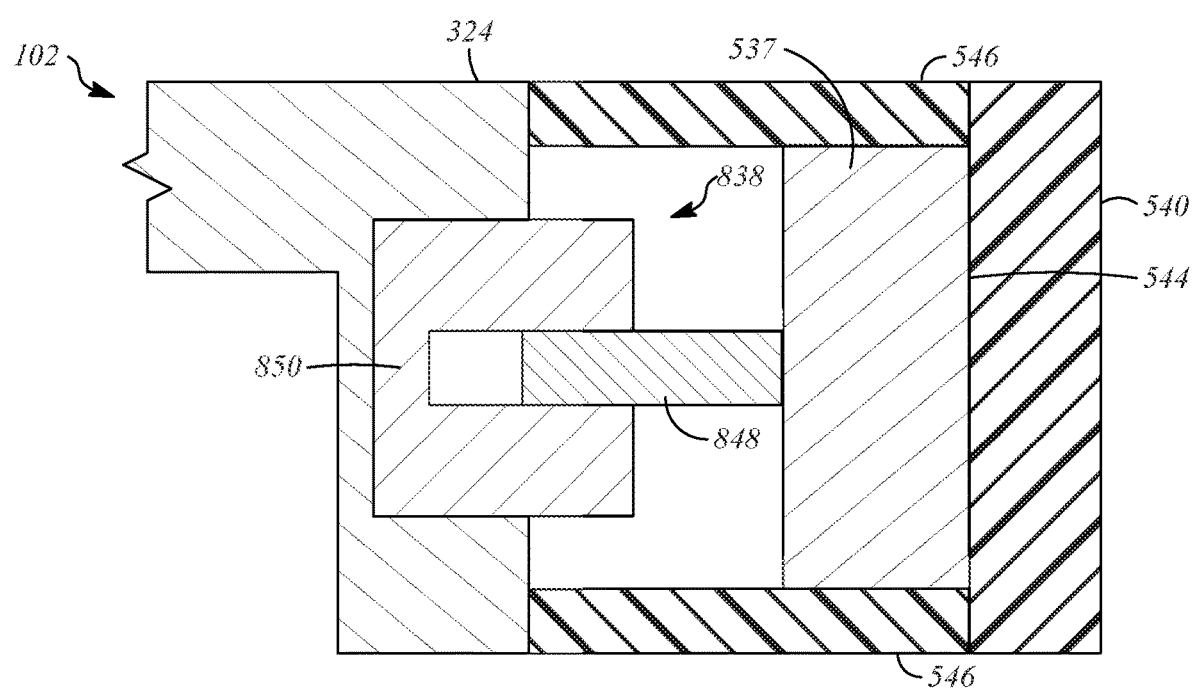
FIG. 8C is a cross-section view illustration taken across line F-F of FIG. 8A showing one of the seal support members supported by the adjustment assembly.

FIGS. 8A-8C show the seal support member 436 supported by an adjustment assembly 838 according to an alternative implementation. In particular, FIG. 8A is a cross-section view illustration taken across line B-B of FIG. 4 showing the seal support member 436 and the adjustment assembly 838 in a first position, FIG. 8B is a cross-section view illustration taken across line B-B of FIG. 4 showing the seal support member 436 and the adjustment assembly 838 in a second position, and FIG. 8C is a cross-section view illustration taken across line F-F of FIG. 8A showing the seal support member 436 and the adjustment assembly 838 the first position.

The adjustment assembly 838 includes first portion 848 that is connected to the seal support member 436 and a second portion 850 that is connected to the peripheral portion 324 of the housing 102. The first portion 848 may be an elongate member such as a rod. The second portion 850 is connected to the first portion 848 in a manner that allows axial motion of the first portion 848 relative to the second portion 850. The second portion 850 may be a receptacle, such as an opening that the first portion 848 is received in the second portion 850.

Movement of the first portion 848 into and out of the second portion 850 changes the distance between the seal support member 436 and the peripheral portion 324 of the housing 102, in order to accommodate the face shape of the user 208 and/or to adjust the fit of the head-mounted display 100 on the head of the user 208. As in the illustrated example, the adjustment assembly 838 may allow movement linearly (i.e., by translation) between the first position (FIG. 8A) and the second position (FIG. 8B). The first position may represent a maximum distance of the seal support member 436 from the peripheral portion 324 of the housing 102, and the second position may represent a minimum distance of the seal support member 436 from the peripheral portion 324 of the housing 102.

The adjustment assembly 838 may include either or both of passive adjustment components and active adjustment components. One example of a passive adjustment mechanism is a spring that is located in the second portion 850 to urge the first portion 848 outward, and allow inward movement of the seal support member 436 in response to engagement with the user 208. One example of an active adjustment mechanism is an electromechanical linear actuator (e.g., a lead screw). In implementations of the adjustment assembly 838 that include active adjustment components, adjustment of the fit of the seal support members 436 can be controlled by a computing device, such as by the electronic components 322, and can be performed using inputs from the sensors 554 and/or other sensors such as temperature sensors or pressure sensors. In some implementations, active adjustment components may also be used to provide tactile feedback to the user 208, for example, in the form of pressure or vibrations, where the tactile feedback is related to the content that is shown on the display devices 320. In some implementations, active components of the adjustment assembly 838 are utilized to provide eye relief adjustment.

In some implementations, the adjustment assembly 838 is used in combination with a rotational adjustment mechanism, such as the hinge assembly 538, the hinge assembly 638, the hinge assembly 738, or an active rotation adjustment mechanism that utilizes, for example, motors operable to adjust a rotational orientation in response to a control signal.

The implementations discussed above include the face seal 104, which is configured to reduce or exclude light from the eye chamber 326. In alternative implementations, the seal support members 436 are not disposed under the face seal 104, and light is not excluded from the eye chamber 326. Instead, the seal support members 436 may be spaced from the housing 102 by an air gap, and cushioning pads such as foam or rubber members can be placed on the front surfaces 544 of the seal support members 436.

Figure 9:
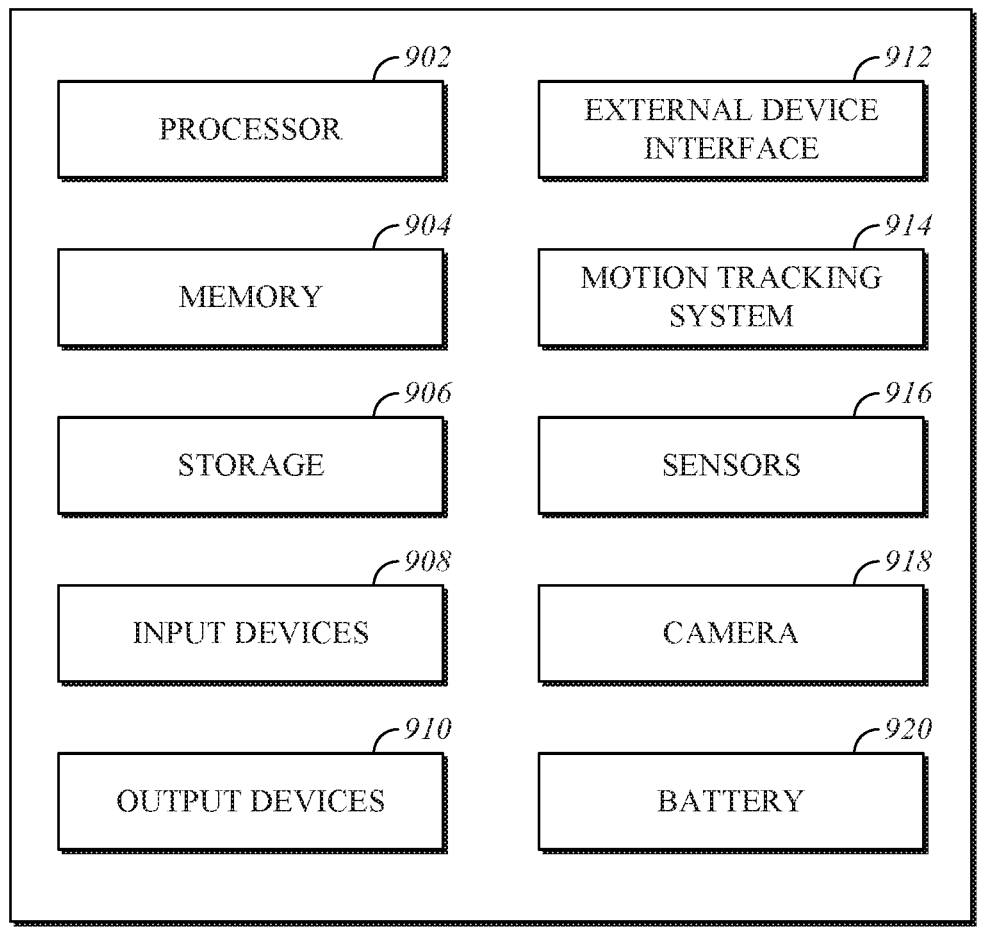
FIG. 9 is a block diagram that shows an example of a hardware configuration for electronic components of the head-mounted display.

FIG. 9 is a block diagram that shows an example of a hardware configuration for the electronic components 322 of the head-mounted display 100. In the illustrated example, the electronic components 322 include a processor 902, memory 904, storage 906, input devices 908, output devices 910, an external device interface 912, a motion tracking system 914, sensors 916, a camera 918, and a battery 920.

The processor 902 is operable to execute computer program instructions and perform operations described by the computer program instructions. As an example, the processor 902 may be a conventional device such as a central processing unit. The memory 904 may be a volatile, high-speed, short-term information storage device such as a random-access memory module. The storage 906 may be a non-volatile information storage device such as a hard drive or a solid-state drive. The input devices 908 may include any type of human-machine interface such as buttons, switches, motion sensitive controllers, a keyboard, a mouse, a touchscreen input device, a gestural input device, or an audio input device (e.g., a microphone). The output devices 910 may include any type of device operable to provide an indication to a user regarding an operating state, such as the display devices 320 or an audio output device (e.g., speakers).

The external device interface 912 is a wired or wireless interface using any type of protocol. As one example, the external device interface 912 may include a wired connection to an external computing device that is utilized to generate content that is displayed by the display devices 320, such as by rendering content to be shown using the display devices 320. As another example, the external device interface 912 can allow wireless connection to internet access to utilize server-based resources during operation of the head-mounted display 100.

The motion tracking system 914 can detect three axis rotations and accelerations of the head-mounted display 100, and provide this information as inputs to the processor 902 or to other systems. As an example, information output by the motion tracking system 914 can be utilized to implement view tracking in certain software applications, and the information output by the motion tracking system 914 can be used by the software application during generation of content to be output for display by the display devices 320. The motion tracking system 914 can include, for example, an inertial measuring unit that utilizes accelerometers, gyroscopes, and magnetometers to output information that describes motion. The motions tracking system can also include other types of motion tracking technologies, such as structured-light stereo devices, depth cameras, LIDAR devices, radar devices, ultrasonic devices, infrared detectors that measure signals from external infrared sources, and infrared beacons that emit signals that can be measured by external infrared detectors.

The sensors 916 various types of sensors in addition to those in the motion tracking system. Examples include biometric sensors, temperature sensors, light sensors and force sensors. The camera 918, which can include a single camera or multiple cameras, can be included to capture video of the environment surrounding the head-mounted display 100 or can be used to sense features in the environment or features of the user. As one example, the camera 918 can be mounted in the eye chamber 326 and used for eye tracking.

The battery 920 supplies electrical power to various components of the head-mounted display 100, including the electronic components 322. As an example, the battery 920 can be a rechargeable battery of any suitable type.

As described above, one aspect of the present technology is the gathering and use of data available from various sources to improve fit of the face seal of a head-mounted device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to adjust the positions and contours of the face seal based on stored user profiles. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of head-mounted device adjustment, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the face deal of the head mounted device can be adjusted using contemporaneously obtained information that is not stored.

What is claimed is:

1. A head-mounted display to be worn by a user, comprising:
    a housing;
    a support member connected to the housing, the support member having a front surface, wherein the front surface of the support member is formed from a rigid material;
    a sensor located directly on the front surface of the support member to maintain a consistent distance between the sensor and the user; and
    a foam face seal including a front portion configured for contact with the user and an interior surface that is positioned adjacent to the front surface of the support member, wherein the foam face seal is formed from a compressible foam structure, and the front surface of the support member defines an adjustable reaction surface for the foam face seal so that the foam face seal can be compressed between the user and the front surface of the support member when the user contacts the front portion of the foam face seal.

2. The head-mounted display of claim 1, wherein the support member is adjustable relative to the housing.

* * * * *